United States Patent
Schleif et al.

(10) Patent No.: US 10,697,532 B2
(45) Date of Patent: Jun. 30, 2020

(54) HOUSING FOR A TRANSMISSION

(71) Applicant: Polaris Industries Inc., Medina, MN (US)

(72) Inventors: Andrew C. Schleif, Stacy, MN (US); Amery D. Kuhl, North Branch, MN (US); David J. Hicke, Hugo, MN (US); Narender Bejawada, Maple Grove, MN (US)

(73) Assignee: Polaris Industries Inc., Medina, MN (US)

( * ) Notice: Subject to any disclaimer, the term of this patent is extended or adjusted under 35 U.S.C. 154(b) by 315 days.

(21) Appl. No.: 15/388,106

(22) Filed: Dec. 22, 2016

(65) Prior Publication Data
US 2018/0180163 A1 Jun. 28, 2018

(51) Int. Cl.
| | |
|---|---|
| *F16H 57/04* | (2010.01) |
| *F16H 9/18* | (2006.01) |
| *F16H 57/035* | (2012.01) |
| *F16H 57/027* | (2012.01) |
| *F16H 57/031* | (2012.01) |
| *F16H 57/02* | (2012.01) |

(52) U.S. Cl.
CPC ........... *F16H 57/0416* (2013.01); *F16H 9/18* (2013.01); *F16H 57/027* (2013.01); *F16H 57/031* (2013.01); *F16H 57/035* (2013.01); *F16H 57/04* (2013.01); *F16H 57/0415* (2013.01); *F16H 57/0489* (2013.01); *F16H 2057/02056* (2013.01)

(58) Field of Classification Search
CPC ............. F16H 57/0489; F16H 57/0415; F16H 57/0416; F16H 57/035; B60Y 2200/124

USPC ................................................... 474/93, 144
See application file for complete search history.

(56) References Cited

U.S. PATENT DOCUMENTS

| 62,016 | A | * | 2/1867 | Custer | ...................... A01L 7/04 |
| | | | | | 59/69 |
| 2,953,032 | A | * | 9/1960 | Ruess | ..................... F16H 55/56 |
| | | | | | 188/264 R |
| 3,467,177 | A | * | 9/1969 | Hoddinott | ........... F16H 57/0415 |
| | | | | | 165/122 |

(Continued)

FOREIGN PATENT DOCUMENTS

| CA | 2807101 | 8/2013 |
| JP | 59-009365 | 1/1984 |

(Continued)

OTHER PUBLICATIONS

"UTVOutpost.com-UTV Side by Side Parts, Accessories & Videos", http://www.utvoutpost.com/new-can-am-maverick-belt-cover-back-plate-transmission-clutch-cover-420612313; 9 pages.

(Continued)

*Primary Examiner* — Henry Y Liu
(74) *Attorney, Agent, or Firm* — Faegre Drinker Biddle & Reath LLP

(57) ABSTRACT

A continuously variable transmission for a utility vehicle includes a drive clutch, a driven clutch operably coupled to the drive clutch, and a housing generally surrounding the drive and driven clutches. The housing includes an inner cover, an outer cover removably coupled to the inner cover, an air inlet positioned on one of the inner cover or the outer cover, and an air outlet positioned on the one of the inner cover or the outer cover.

21 Claims, 12 Drawing Sheets

(56) References Cited

U.S. PATENT DOCUMENTS

| | | | | |
|---|---|---|---|---|
| 3,789,684 A * | 2/1974 | Freier, Jr. | ............ | A01D 34/6806 474/33 |
| 3,943,785 A * | 3/1976 | Percifield | ........... | A01D 34/6806 474/93 |
| 4,395,249 A | 7/1983 | Prasad | | |
| 4,422,498 A * | 12/1983 | Chen | .................... | B23Q 11/127 165/47 |
| 4,493,677 A * | 1/1985 | Ikenoya | .................... | B62M 9/06 474/150 |
| 4,531,928 A * | 7/1985 | Ikenoya | .................... | B62M 9/06 180/229 |
| 4,594,537 A * | 6/1986 | Arifian | ................. | G05D 1/0077 318/564 |
| 4,596,537 A * | 6/1986 | Te-Long | .................... | F16H 9/12 474/93 |
| 4,631,977 A * | 12/1986 | Kawashima | ............. | B62M 9/06 474/150 |
| 4,632,070 A * | 12/1986 | Onda | ........................ | B62M 7/06 123/41.58 |
| 4,645,028 A * | 2/1987 | Kawashima | ......... | B62K 25/283 180/227 |
| 4,671,781 A * | 6/1987 | Tanaka | .................... | B62M 7/06 180/229 |
| 4,671,782 A * | 6/1987 | Ochiai | .................... | B62M 7/06 474/93 |
| 4,697,665 A * | 10/1987 | Eastman | .................. | B62K 5/01 123/195 C |
| 4,708,699 A * | 11/1987 | Takano | .................... | F02B 77/13 474/144 |
| 4,712,629 A * | 12/1987 | Takahashi | ............... | B60K 11/06 123/41.66 |
| 4,905,461 A * | 3/1990 | Heuer | .................... | A01D 34/003 56/12.8 |
| 5,086,858 A * | 2/1992 | Mizuta | .................... | B60K 11/06 123/41.56 |
| 5,152,361 A * | 10/1992 | Hasegawa | ................. | B62M 7/02 180/227 |
| 5,976,044 A * | 11/1999 | Kuyama | ................. | F02B 61/02 474/146 |
| 6,176,796 B1 * | 1/2001 | Lislegard | ............... | F16H 55/56 474/93 |
| 6,267,700 B1 * | 7/2001 | Takayama | ............... | F02B 61/02 474/144 |
| 6,338,688 B1 * | 1/2002 | Minami | ................ | F16H 57/029 474/144 |
| 6,820,708 B2 * | 11/2004 | Nakamura | ........... | F16H 57/0489 180/296 |
| 6,848,348 B2 * | 2/2005 | Liao | .................... | B23Q 11/127 165/48.1 |
| 6,938,508 B1 * | 9/2005 | Saagge | .................... | F16H 9/18 192/113.23 |
| 6,938,676 B2 * | 9/2005 | Lan | ........................ | B62K 5/01 165/41 |
| 7,002,454 B1 * | 2/2006 | Gustafson | ............... | F16H 57/01 340/425.5 |
| 7,070,527 B1 * | 7/2006 | Saagge | .................... | F16H 55/56 474/93 |
| 7,086,837 B2 * | 8/2006 | Kamoshita | ............ | F04D 29/281 416/181 |
| 7,363,999 B2 | 4/2008 | Hastings | | |
| 7,392,893 B2 | 7/2008 | Inomoto | | |
| 7,427,248 B2 * | 9/2008 | Chonan | .................. | F16H 57/05 474/150 |
| 7,438,147 B2 | 10/2008 | Kato | | |
| 7,686,123 B2 * | 3/2010 | Ishida | ................ | B62K 11/04 180/219 |
| 7,771,299 B2 * | 8/2010 | Mochizuki | ................ | F16H 9/18 180/229 |
| 8,002,061 B2 * | 8/2011 | Yamamura | ............ | B60K 11/00 180/68.1 |
| 8,104,524 B2 | 1/2012 | Manesh | | |
| 8,109,308 B2 | 2/2012 | Manesh | | |
| 8,157,039 B2 | 4/2012 | Melvin | | |
| 8,176,957 B2 | 5/2012 | Manesh | | |
| 8,256,563 B2 | 9/2012 | Suzuki | | |
| 8,381,855 B2 * | 2/2013 | Suzuki | .................. | B60K 11/04 180/296 |
| 8,382,620 B2 * | 2/2013 | Morita | ..................... | F16H 9/18 474/13 |
| 8,439,141 B2 | 5/2013 | Bessho | | |
| 8,459,397 B2 | 6/2013 | Bessho | | |
| 8,556,015 B2 * | 10/2013 | Itoo | .................... | B60K 11/08 180/68.1 |
| 8,596,406 B2 * | 12/2013 | Itoo | .................... | F16H 57/0416 165/42 |
| 8,613,335 B2 * | 12/2013 | Deckard | ............. | F16H 57/0416 180/68.1 |
| 8,834,307 B2 * | 9/2014 | Itoo | .................... | F16H 57/0416 474/93 |
| 8,840,496 B2 * | 9/2014 | Yamanishi | ............. | B60K 11/08 180/68.1 |
| 8,911,312 B2 * | 12/2014 | Itoo | .................... | F16H 57/03 474/93 |
| 8,950,290 B2 | 2/2015 | Dieter | | |
| 8,997,908 B2 | 4/2015 | Kinsman | | |
| 9,108,470 B2 | 8/2015 | Tercha | | |
| 9,341,255 B2 * | 5/2016 | Itoo | .................... | F16H 57/0489 |
| 9,366,331 B2 | 6/2016 | Eberhardt | | |
| 9,453,573 B2 | 9/2016 | Renner | | |
| 9,566,858 B2 | 2/2017 | Hicke | | |
| 9,718,351 B2 | 8/2017 | Ripley | | |
| 9,863,523 B2 * | 1/2018 | Stocks | ................. | F16H 57/0416 |
| 9,909,659 B2 * | 3/2018 | Bessho | ................. | F16H 57/027 |
| 10,183,605 B2 | 1/2019 | Weber | | |
| 10,246,153 B2 | 4/2019 | Deckard | | |
| 10,369,861 B2 | 8/2019 | Deckard | | |
| 2004/0094343 A1 * | 5/2004 | Fukuda | ............... | F16H 57/0415 180/68.2 |
| 2004/0195019 A1 * | 10/2004 | Kato | ...................... | B60K 13/02 180/68.3 |
| 2004/0195034 A1 * | 10/2004 | Kato | ...................... | B60K 17/34 180/312 |
| 2004/0224806 A1 * | 11/2004 | Chonan | ............... | F16H 57/0415 474/93 |
| 2006/0032690 A1 * | 2/2006 | Inomoto | ................... | B60K 6/48 180/229 |
| 2006/0090942 A1 * | 5/2006 | Hastings | ............. | F16H 57/0415 180/68.1 |
| 2006/0270503 A1 * | 11/2006 | Suzuki | ............... | F16H 57/0415 474/144 |
| 2007/0219030 A1 * | 9/2007 | Ho | ........................ | F16H 57/035 474/144 |
| 2008/0283326 A1 * | 11/2008 | Bennett | .................... | B60B 3/142 180/246 |
| 2009/0298627 A1 * | 12/2009 | Johnson | .................... | F16H 9/18 474/93 |
| 2010/0155170 A1 * | 6/2010 | Melvin | ................... | B60K 11/08 180/339 |
| 2011/0094818 A1 * | 4/2011 | Suzuki | ..................... | B60K 5/02 180/292 |
| 2012/0055728 A1 * | 3/2012 | Bessho | .................... | B60K 5/04 180/292 |
| 2012/0055729 A1 * | 3/2012 | Bessho | .................... | B60K 5/04 180/309 |
| 2012/0137828 A1 * | 6/2012 | Dieter | ................... | B60K 17/00 74/665 F |
| 2012/0289370 A1 * | 11/2012 | Yamanishi | ............. | B60K 11/08 474/93 |
| 2013/0033070 A1 * | 2/2013 | Kinsman | ............... | B62D 21/183 296/190.03 |
| 2013/0087403 A1 * | 4/2013 | Itoo | .................... | F16H 57/0416 180/339 |
| 2013/0090198 A1 * | 4/2013 | Itoo | ........................ | F16H 57/03 474/93 |
| 2013/0090199 A1 * | 4/2013 | Itoo | .................... | F16H 57/0416 474/93 |
| 2013/0220766 A1 * | 8/2013 | Tadych | ................. | F04D 17/165 192/113.23 |
| 2013/0240272 A1 | 9/2013 | Gass | | |

(56) References Cited

U.S. PATENT DOCUMENTS

| | | | |
|---|---|---|---|
| 2014/0262584 A1* | 9/2014 | Lovold | B60K 5/12 180/246 |
| 2014/0348671 A1* | 11/2014 | Pagliarin | F04B 35/04 417/362 |
| 2015/0024890 A1* | 1/2015 | Eberhardt | F16H 57/0416 474/144 |
| 2015/0061275 A1 | 3/2015 | Deckard | |
| 2015/0308561 A1* | 10/2015 | Itoo | F16H 57/0489 474/93 |
| 2015/0377341 A1* | 12/2015 | Renner | F16H 57/0489 474/93 |
| 2016/0061314 A1 | 3/2016 | Kuhl | |
| 2016/0176283 A1* | 6/2016 | Hicke | B60K 11/04 180/292 |
| 2016/0176284 A1* | 6/2016 | Nugteren | B60K 13/04 180/309 |
| 2016/0176287 A1 | 6/2016 | Ripley | |
| 2018/0178677 A1 | 6/2018 | Swain | |
| 2018/0180163 A1 | 6/2018 | Schleif | |
| 2019/0193501 A1 | 6/2019 | Brady | |
| 2019/0210457 A1 | 7/2019 | Galsworthy | |
| 2019/0285159 A1 | 9/2019 | Nelson | |
| 2019/0285160 A1 | 9/2019 | Nelson | |

FOREIGN PATENT DOCUMENTS

| | | |
|---|---|---|
| JP | 5977924 | 5/1984 |
| JP | 2009228708 | 10/2009 |
| JP | 5990365 | 9/2016 |
| WO | WO 2014/059258 | 4/2014 |
| WO | WO 2018/118470 | 6/2018 |
| WO | WO 2019/126485 | 6/2019 |

OTHER PUBLICATIONS

"The Avid Off Racing BITD/SCORE factory Can Am Maverick race build", www.Maverickforums.net; 31 pages.

"Alba Racing Belt Gauge", www.Maverickforums.net; 8 pages.

Decision to Institute 37 C.F.R. § 42.108 issued by the U.S. Patent and Trademark Office Trial and Appeal Board, *Arctic Cat, Inc.* v. *Polaris Industries, Inc.*, Feb. 3, 2016; 22 pages.

Decision Institution of Inter Partes Review 37 C.F.R. § 42.108 issued by the U.S. Patent and Trademark Office Trial and Appeal Board, *Artic Cat, Inc.* v. *Polaris Industries, Inc.*, Feb. 3, 2016, 34 pages.

"2011 Polaris Ranger RZR XP 900 First Look-Motorcycle Today", www.motorcycle-usa.com/2011/01/articile/2011-polaris-ranger-rzr-xp-900-first-look/, Jan. 3, 2011; 0 pages.

Patent Cooperation Treaty International Search Report and Written Opinion, PCT/US2017/065520 to Polaris Industrie Inc., dated Mar. 9, 2018, 13 pages.

Written Opinion of the International Searching Authority, dated Jun. 20, 2019, for International Patent Application No. PCT/US2019/022912; 11 pages.

Written Opinion issued by the European Patent Office, dated Mar. 25, 2014, for International Patent Application No. PCT/US2013/064516; 17 pages.

International Search Report issued by the International Searching Authority, dated Jun. 20, 2019, for International Patent Application No. PCT/US2019/022912; 3 pages.

International Search Report issued by the European Patent Office, dated Mar. 25, 2014, for International Patent Application No. PCT/US2013/064516; 6 pages.

International Preliminary Report on Patentability issued by The International Bureau of WIPO, dated Apr. 14, 2015, for International Patent Application No. PCT/US2013/064516; 18 pages.

Decision Institution of Inter Partes Review 37 CFR § 42.108 issued by the U.S. Patent and Trademark Office Trial and Appeal Board, *Arctic Cat, Inc.* v. *Polaris Industries Inc.*, Feb. 3, 2016; 34 pages.

International Preliminary Report on Patentability issued by The International Bureau of WIPO, dated Jun. 25, 2019, for International Patent Application No. PCT/US2017/065520; 8 pages.

* cited by examiner

HOUSING FOR A TRANSMISSION

FIELD OF THE DISCLOSURE

The present invention relates generally to a transmission for a vehicle and, in particular, to a housing for a continuously variable transmission for a vehicle.

BACKGROUND OF THE DISCLOSURE

Some vehicles such as utility vehicles, all-terrain vehicles, tractors, and others include a continuously variable transmission ("CVT"). The CVT includes a drive clutch, a driven clutch, and a belt configured to rotate between the drive and driven clutches. The position of the drive and driven clutches may be moved between a plurality of positions when the vehicle is operating.

Available space is often limited around the CVT which may make it difficult to service various component of the CVT, for example the belt. Additionally, the intake duct and the exhaust duct of the CVT must be positioned to receive appropriate air flow to cool the components within a housing of the CVT. Therefore, it is necessary to appropriately configure a CVT for sufficient air flow within the housing and for ease of serviceability and maintenance.

SUMMARY OF THE DISCLOSURE

In one embodiment of the present disclosure, a continuously variable transmission for a utility vehicle comprises a drive clutch, a driven clutch operably coupled to the drive clutch, and a housing generally surrounding the drive and driven clutches. The housing includes an inner cover, an outer cover removably coupled to the inner cover, an air inlet positioned on one of the inner cover or the outer cover, and an air outlet positioned on the one of the inner cover or the outer cover.

In another embodiment of the present disclosure, a continuously variable transmission for a utility vehicle comprises a drive clutch, a driven clutch operably coupled to the drive clutch, and a housing generally surrounding the drive and driven clutches. The housing includes an inner cover and an outer cover removably coupled to the inner cover. The housing is configured to direct air in a first direction at the inner cover and in a second direction at the inner cover, and the second direction is different than the first direction.

In a further embodiment of the present disclosure, a continuously variable transmission comprises a drive clutch having a moveable sheave and a stationary sheave, a driven clutch operably coupled to the drive clutch and having a moveable sheave and a stationary sheave, and a housing generally surrounding the drive and driven clutches. The housing includes an inner cover, an outer cover removably coupled to the inner cover, an air inlet positioned on one of the inner cover or the outer cover, and an air outlet spaced apart from the air inlet. The air outlet has a width and includes a substantially tangent surface extending laterally to define the width of the air outlet and extending along a portion of the moveable sheave and the stationary sheave of the driven clutch. The housing has a rear surface configured to flow air along the tangent surface when the air is expelled from the housing.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 1:
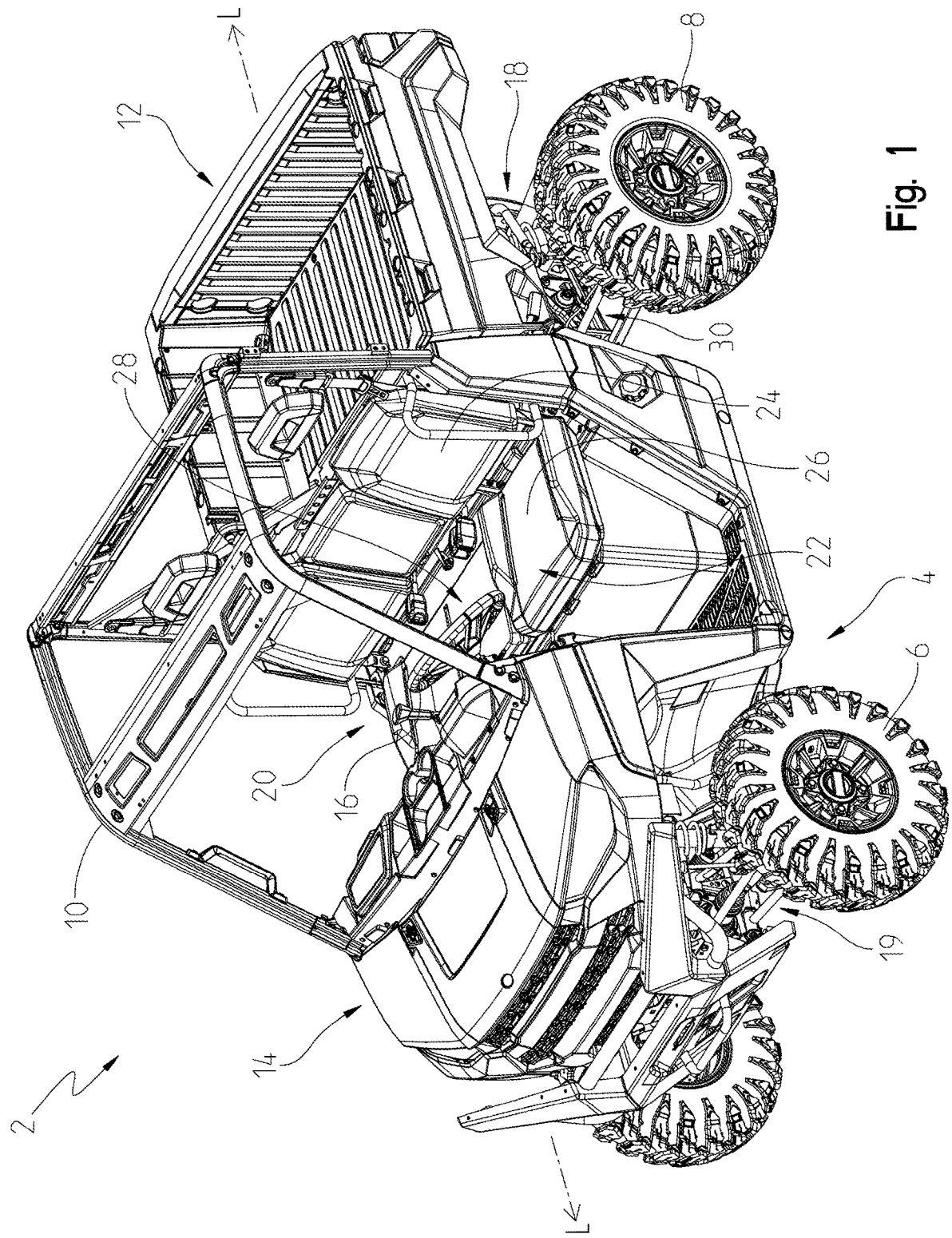
FIG. 1 is a front left perspective view of a utility vehicle of the present disclosure.

Referring to FIG. 1, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, Minn. 55340 or non-pneumatic tires, such as those shown in U.S. Pat. No. 8,176,957 and U.S. Pat. No. 8,104,524, the complete disclosures of which are expressly incorporated herein by reference.

Vehicle 2 further includes a lower frame assembly (not explicitly shown) supported by ground-engaging members 4, which extends along a longitudinal axis L of vehicle 2. Additionally, in one embodiment, vehicle 2 may include an upper frame assembly 10 extending vertically above the lower frame assembly, however, alternative embodiments of vehicle 2 may not include upper frame assembly 10. The lower frame assembly supports a rear cargo area 12 and a vehicle body 14, which includes a plurality of body panels.

Vehicle 2 also includes an open-air operator area 20 which, illustratively, includes seating 22 for one or more passengers. As such, operator area 20 is exposed to ambient air and is not fully enclosed. Alternatively, vehicle 2 may include a cab assembly (not shown), such as a roof, front windshield, rear windshield, and doors, to enclose operator area 20. Upper frame assembly 10 may be positioned generally around operator area 20 such that seating 22 is at least partially surrounded by upper frame assembly 10. Illustratively, seating 22 includes an operator seat and a passenger seat, however, seating 22 may also include rear seats for additional passengers or may include only a single seat for carrying the operator. Seating 22 may include a seat back 24 and a seat bottom 26.

Operator area 20 further includes a plurality of operator controls 28, such as a steering wheel 16, by which an operator may provide input for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a rear suspension assembly 18 and a front suspension assembly 19, both supported by the lower frame assembly. Additional details of rear and front suspension assemblies 18, 19 may be disclosed in U.S. Patent Application Publication Nos. 2016/0176283, 2016/0176284, and 2016/0176287, the complete disclosures of which are expressly incorporated by reference herein.

Referring to FIGS. 1-4, vehicle 2 further includes a powertrain assembly 30 which is supported by the lower frame assembly and includes at least an engine 32, a geartrain (not explicitly shown), and a continuously variable transmission ("CVT") 34. As shown in FIGS. 1-4, engine 32 is positioned at least partially rearward of seating 22 and CVT 34 is positioned laterally outward from or to the side of engine 32 in a direction generally perpendicular to longitudinal axis L (FIG. 1) and extends generally parallel to longitudinal axis L of vehicle 2. More particularly, CVT 34 is positioned along the left side of vehicle 2 and is positioned at least partially rearward of seating 22. While not explicitly shown, the geartrain may be positioned rearward of engine 32 and laterally inward from a portion of CVT 34. In alternative embodiments, CVT 34 may extend in a generally perpendicular direction relative to longitudinal axis L or may be configured in any orientation relative to longitudinal axis L, engine 32, and the geartrain. In further alternative embodiments, portions of powertrain assembly 30, for example engine 32, may be positioned at least partially forward of seating 22.

Figure 2:
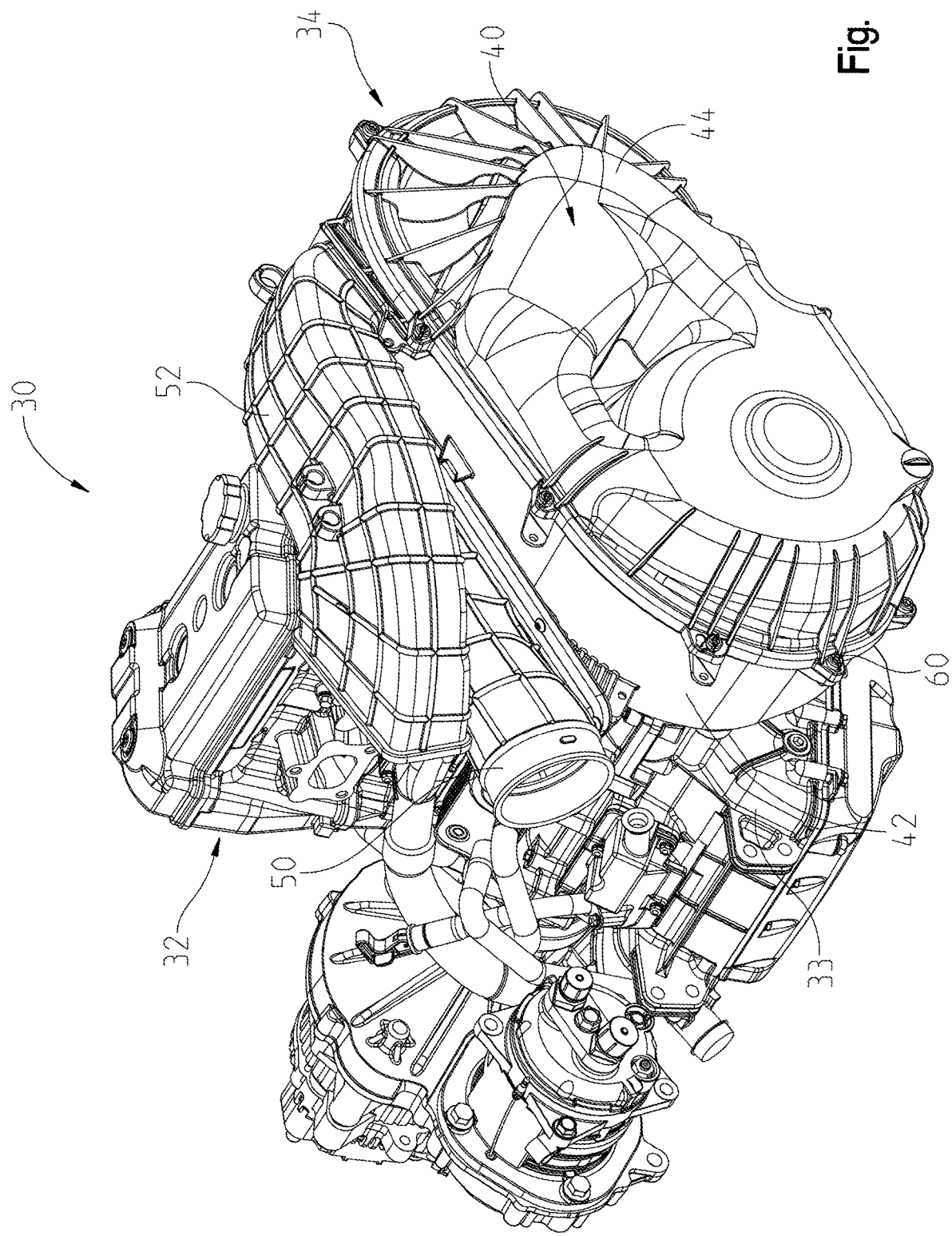
FIG. 2 is a front left perspective view of a powertrain assembly of the vehicle of FIG. 1.
Figure 3:
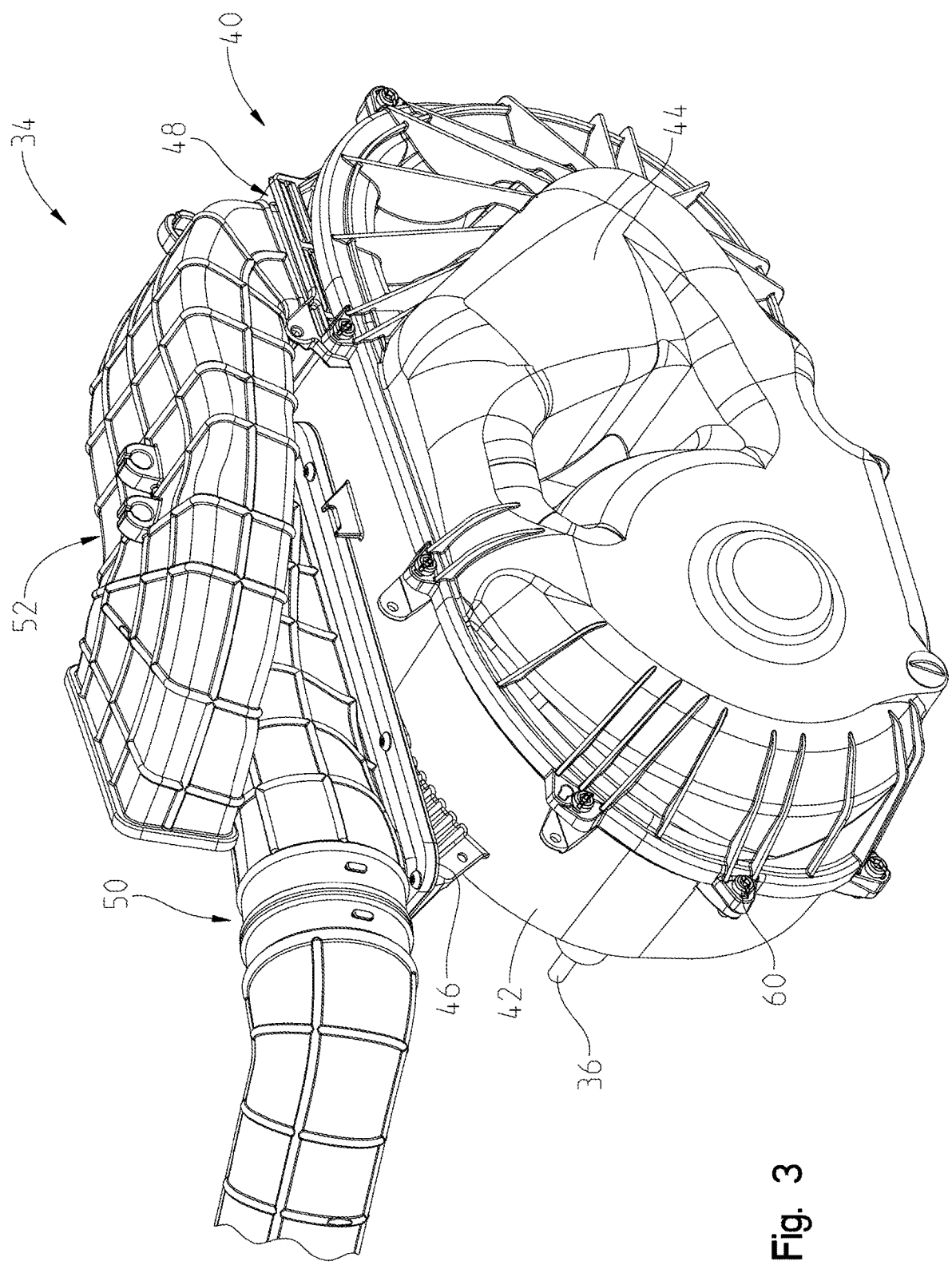
FIG. 3 is a front left perspective view of a continuously variable transmission ("CVT") of the powertrain assembly of FIG. 2.
Figure 4:
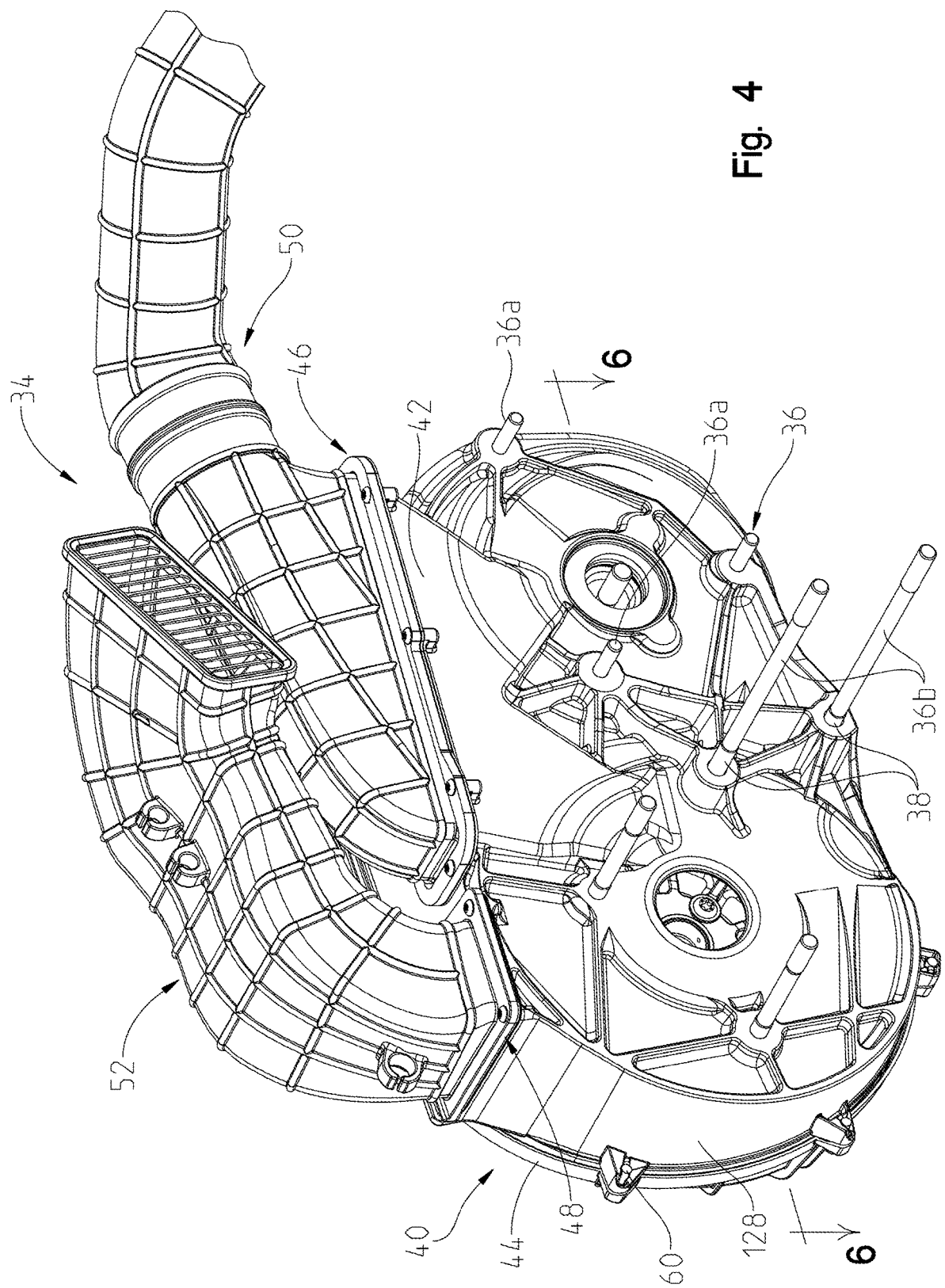
FIG. 4 is a rear right perspective view of the CVT of FIG. 3.

As shown in FIGS. 2-4, CVT 34 is coupled to both engine 32 and the geartrain with fasteners 36 which are received within mounting bosses (not shown) on a crankcase 33 of engine 32 and the housing of the geartrain. More particularly, and as shown in FIG. 4, fasteners 36a are received within the mounting bosses on engine 32 and, illustratively, fasteners 36a do not include a shoulder or protrusion. As such, fasteners 36a extend continuously from CVT 34 to engine 32 such that engine 32 is mounted in close proximity to CVT 34 and, in some embodiments, may be in direct contact or abutment with CVT 34 to allow for a compact configuration of powertrain assembly 30 on vehicle 2. Additionally, the mounting bosses on engine 32 have a tight or small tolerance with fasteners 36a such that no alignment tool or guide is needed to properly align CVT 34 with engine 32 because fasteners 36a do not move within the mounting bosses.

Conversely, fasteners 36b couple CVT 34 to the geartrain and do include a shoulder 38. Shoulder 38 is configured to provide any necessary distance between CVT 34 and the geartrain when fasteners 36b are received within the mounting bosses (not shown) on the geartrain. However, to position CVT 34 and the geartrain in close proximity, at least a portion of shoulder 38 may be received within the mounting bosses on the geartrain. Additionally, the mounting bosses on the geartrain have a tight or small tolerance with fasteners 36b and shoulders 38 such that no alignment tool or guide is needed to properly align CVT 34 with the geartrain because fasteners 36b do not move within the mounting bosses.

Figure 10:
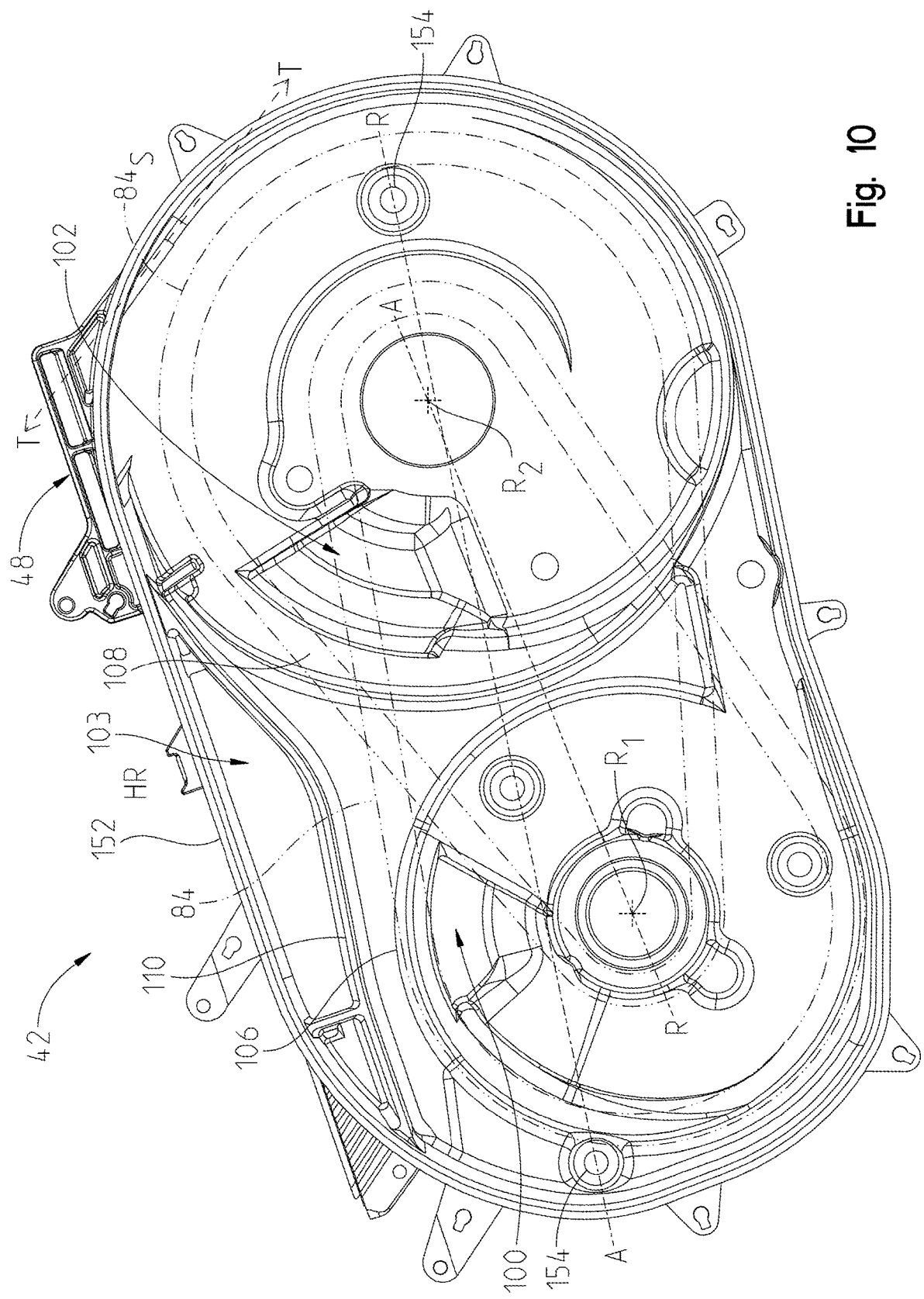
FIG. 10 is a left side view of the inner cover of FIG. 9, illustrating first and second positions of a belt positioned with the housing.

CVT 34 is further aligned and mounted on the geartrain and engine 32 using alignment openings 154 shown in FIG. 10. Alignment openings are configured to receive fasteners for further coupling and aligning CVT 34 on engine 32 and/or the geartrain. As shown in FIG. 10, an axis A extending through the centers of openings 154 is at a small angle to an axis R extending through the rotation axes $R_1$, $R_2$ of the drive and driven clutches, identified further herein. As such, this close horizontal alignment between axis A extending through openings 154 and axis R extending through rotational axes $R_1$, $R_2$ of the drive and driven clutches improves the structural mounting of inner cover 42 to engine 32 and/or the geartrain because the load supported at openings 154 is generally on the same plane or adjacent the plane of rotational axes $R_1$, $R_2$.

With respect to FIGS. 2-8, CVT 34 includes a housing 40 having an inner portion or cover 42 and an outer portion or cover 44 removably coupled together. In one embodiment, inner cover 42 is comprised of a metallic material, such as aluminum. By comprising inner cover 42 of a metallic material, rather than a plastic material with less rigidity and strength, inner cover 42 may be a structural component of CVT 34 configured to receive a load or otherwise structurally support CVT 34 on engine 32 and the housing of the geartrain. Additionally, outer cover 44 may be comprised of a polymeric material, such as an injection-moldable plastic. Alternatively, outer cover 44 also may be comprised of a metallic material and may be a structural component configured to receive a load or otherwise structurally support components of CVT 34 on engine 32, the geartrain, and/or any component of vehicle 2. As shown best in FIG. 6, outer cover 44 generally follows the shape and contour of the drive and driven clutches which may increase air shear and improve heat transfer because the outer surface of outer cover 44 is closely positioned to the sheaves of the drive and driven clutches.

Figure 7:
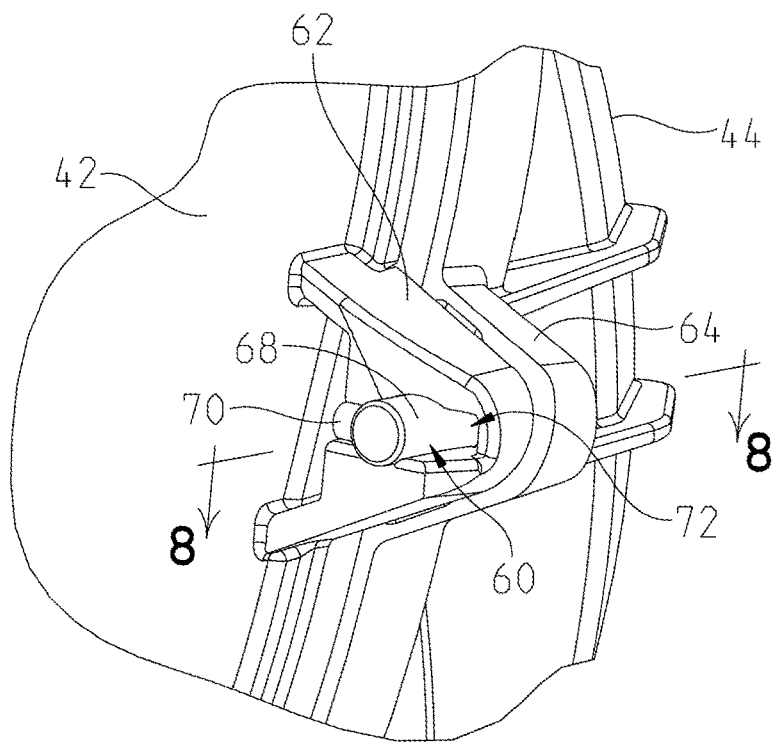
FIG. 7 is a front right perspective view of a fastener removably coupling together an inner cover and an outer cover of a housing of the CVT of FIG. 3.
Figure 8:
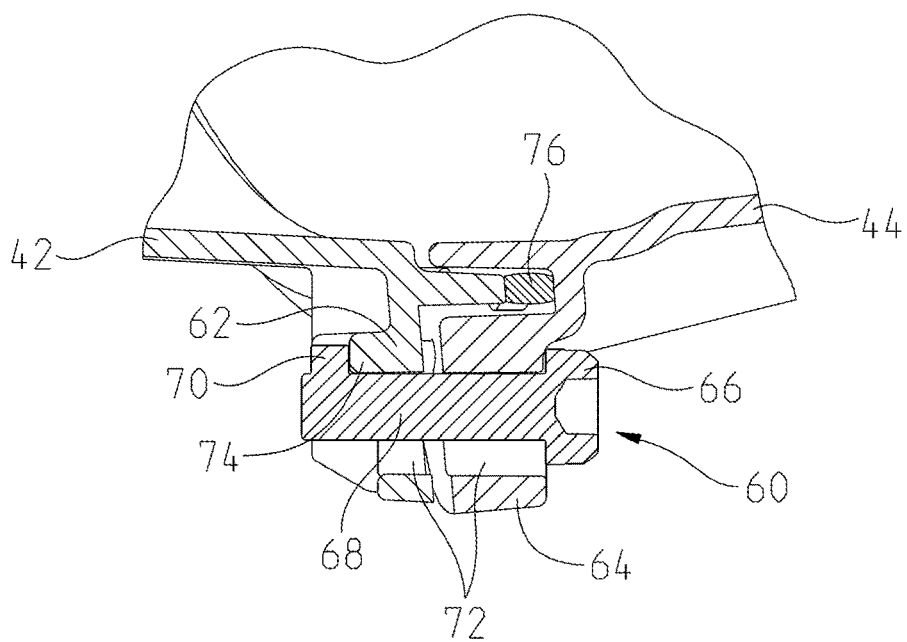
FIG. 8 is a cross-sectional view of the fastener of FIG. 7, taken along line 8-8 of FIG. 7.

As shown best in FIGS. 7 and 8, inner and outer covers 42, 44 are coupled together using removable fasteners 60. Fasteners 60 are non-threaded or threadless fasteners configured to extend through a tab 62 on inner cover 42 and a tab 64 on outer cover 44. A head 66 of fastener 60 abuts tab 64 on outer cover 44 and a shaft 68 of fastener 60 extends through both tabs 62, 64. Shaft 68 includes a protrusion 70 extending substantially perpendicularly from the longitudinal direction of shaft 68. Protrusion 70 is configured to be received within recesses 72 of tabs 62, 64 when assembling inner and outer covers 42, 44 together. However, in order to securely seal inner and outer covers 42, 44 together, fastener 60 is rotated within recesses 72 until protrusion 70 abuts a shoulder 74 on tab 62 of inner cover 42. Shoulder 74 prevents protrusion 70 from moving and, as such, securely maintains the coupling between inner and outer covers 42, 44. In one embodiment, fastener 60 is rotated approximately 180° to abut protrusion 70 with shoulder 74. In further embodiments, fastener 60 is rotated approximately 90-359° to abut protrusion 70 with shoulder 74. In this way, fastener 60 allows for removable coupling between inner and outer covers 42, 44 such that mere rotate of fastener 60 either couples together or releases inner cover 42 and outer cover 44.

Additionally, and as shown in FIGS. 5-8, to ensure that inner cover 42 is sealed against outer cover 44, a gasket or other sealing member 76 is positioned intermediate inner and outer covers 42, 44. Gasket 76 is configured to generally abut the full circumference of both inner and outer covers 42, 44 to ensure that all contact points between covers 42, 44 are sealed from fluids and dust, debris, or other particulate matter. When fastener 60 is rotated to abut protrusion 70 with shoulder 74, outer cover 44 is pulled towards inner cover 42 and/or inner cover 42 is pulled toward outer cover 44 and gasket 76 is compressed therebetween. In this way, fasteners 60 provide both the coupling necessary to removably attach outer cover 44 to inner cover 42 and also to seal outer cover 44 to inner cover 42 through compression of gasket 76.

CVT housing 40 also includes an air intake or inlet port 46 for receiving air to cool CVT 34 and an air outlet or exhaust port 48 to exhaust warm or hot air from CVT 34. Illustratively, CVT housing 40 includes a single inlet port 46 and a single outlet port 48 and both inlet port 46 and outlet port 48 are positioned in inner cover 42 of housing 40, as disclosed further herein. In this way, outer cover 44 does not include either inlet port 46 or outlet port 48.

Referring still to FIGS. 2-6, inlet port 46 is sealingly coupled with a seal or gasket to an intake duct 50 to provide cooling air to CVT 34. Additionally, outlet port 48 is sealingly coupled with a seal or gasket to an exhaust duct 52 to expel hot air from CVT 34. Illustratively, because both inlet and outlet ports 46, 48 are positioned on inner cover 42, both intake and exhaust ducts 50, 52 extend upwardly from inner cover 42 to facilitate air flow to and from CVT 34. In this way, if CVT 34 requires any maintenance or servicing of internal components, only outer cover 44 needs to be removed in order to access the internal components of CVT 34. As such, in the illustrative embodiment of CVT 34, there is no need to remove either intake or exhaust ducts 50, 52 when servicing or replacing the internal components of CVT 34.

Additionally, and as shown in FIGS. 2-5, 9, and 10, housing 40 includes an upper surface 152 which includes both inlet port 46 and outlet port 48. Illustratively, upper surface 152 of housing 40, and in particular the portion of upper surface 152 extending between intake and outlet ports 46, 48, is a planar surface that extends in generally horizontal configuration therebetween. By including housing 40 with a planar upper surface 152, improved sealing occurs between intake duct 50 and inlet port 46 and exhaust duct 52 and outlet port 48. More particularly, because there is no protrusion, bump-out, or other raised portion of upper surface 152, the fasteners (e.g., screws) which couple ducts 50, 52 to ports 46, 48, respectively, are able to extend into a planar surface without any protrusions that may make it difficult to compress the seals between ducts 50, 52 and ports 46, 48, respectively.

Referring again to FIGS. 5 and 6, CVT 34 includes a primary or drive clutch or pulley 80, a secondary or driven clutch or pulley 82, and a belt 84 extending therebetween. Drive clutch 80 is rotatably coupled to a crankshaft (not shown) of engine 32. Driven clutch 82 is rotatably coupled to an input shaft (not shown) of the geartrain and is rotatably coupled to drive clutch 80 through belt 84. Belt 84 may be comprised of a polymeric material, for example rubber, and may also include reinforcing members, such as metal cords or other reinforcing material. In one embodiment, belt 84 may be comprised of a metallic material, for example, belt 84 may be a chain. In cross-section, belt 84 may generally define a "V" shape. Belt 84 is configured to contact drive clutch 80 and, in one embodiment, expand in diameter in order to contact driven clutch 82.

Figure 5:
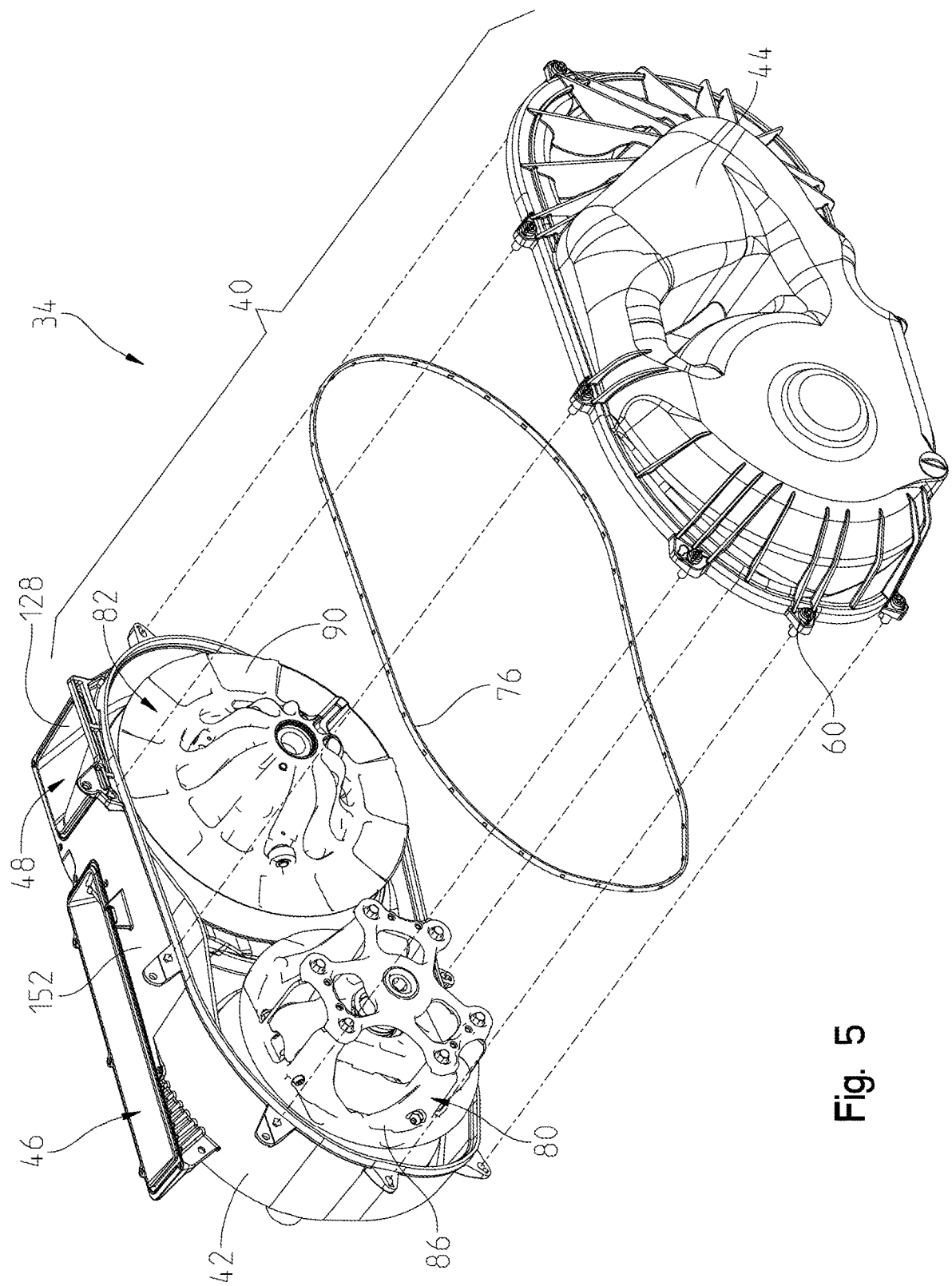
FIG. 5 is an exploded view of the CVT of FIG. 3.
Figure 6:
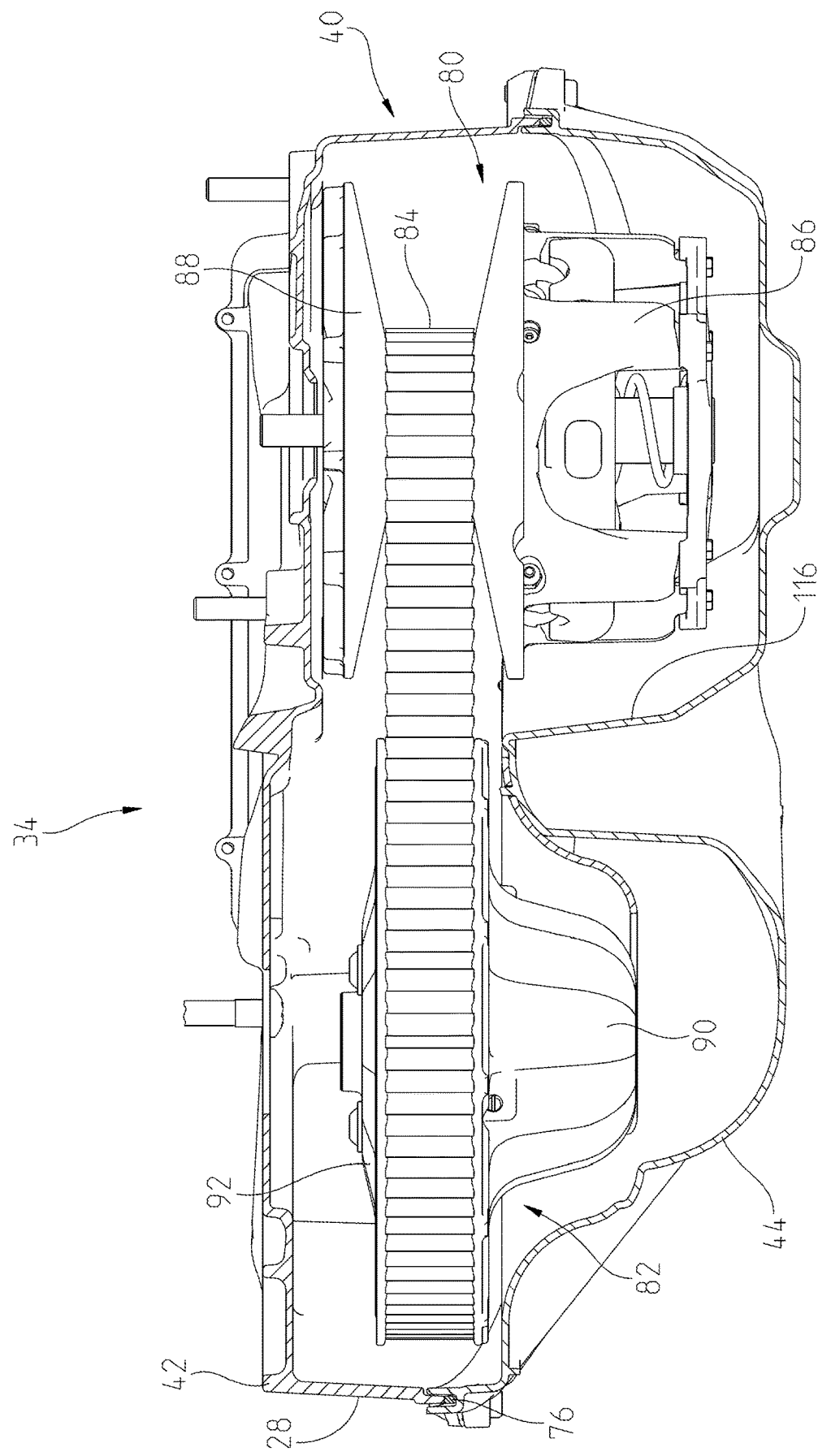
FIG. 6 is a cross-sectional view of the CVT of FIG. 4, taken along line 6-6 of FIG. 4.

As shown in FIGS. 5 and 6, drive clutch 80 includes a moveable sheave 86 positioned adjacent outer cover 44 of CVT 34 and a stationary sheave 88 positioned adjacent inner cover 42 of CVT 34. During operation of CVT 34, stationary sheave 88 maintains a fixed position and does not move relative to moveable sheave 86. Conversely, moveable sheave 86 of drive clutch 80 is configured for lateral movement relative to stationary sheave 88 in order to engage belt 84 and effect various drive ratios. The lateral movement of moveable sheave 86 occurs generally in a direction perpendicular to longitudinal axis L (FIG. 2). Additional details of drive clutch 80 may be disclosed in U.S. Patent Application Publication Nos. 2016/0176283, 2016/0176284, and 2016/0176287, the complete disclosures of which are expressly incorporated by reference herein.

Referring still to FIGS. 5 and 6, the rotation of belt 84 caused by drive clutch 80 drives driven clutch 82. Driven clutch 82 includes a stationary sheave 90 positioned adjacent outer cover 44 and a moveable sheave 92 positioned adjacent inner cover 42. Stationary sheave 90 is coupled to a shaft of the geartrain and maintains a fixed position relative to moveable sheave 92. Moveable sheave 92 may be configured for lateral translational movement between a closed position when adjacent stationary sheave 90 and an open position in which moveable sheave 92 slides or otherwise moves laterally apart from stationary sheave 90. The movement of moveable sheave 92 engages belt 84 in various configurations in order to effect various driving ratios for vehicle 2. Additional details of driven clutch 82 may be disclosed in U.S. Patent Application Publication Nos. 2016/0176283, 2016/0176284, and 2016/0176287, the complete disclosures of which are expressly incorporated by reference herein.

During operation of CVT 34, drive clutch 80 engages belt 84 and when belt 84 engages driven clutch 82, driven clutch 82 rotates, which causes the shaft of the geartrain to rotate. More particularly, drive clutch 80 rotates with the crankshaft of engine 32 and the rotation thereof drives rotation of driven clutch 82 through rotation of belt 84. Depending on the operating conditions of vehicle 2, moveable sheaves 86, 92 of drive clutch 80 and driven clutch 82, respectively, may be moved relative to stationary sheaves 88, 90 to adjust driving ratios for vehicle 2. During movement of moveable sheaves 86, 92, belt 84 is configured to move between a starting position, as shown in FIG. 10 as $84_S$, and a high-ratio position, as shown in FIG. 10 as $84_{HR}$. Movement of moveable sheaves 86, 92 may be electronically, mechanically, or fluidly controlled.

Figure 9:
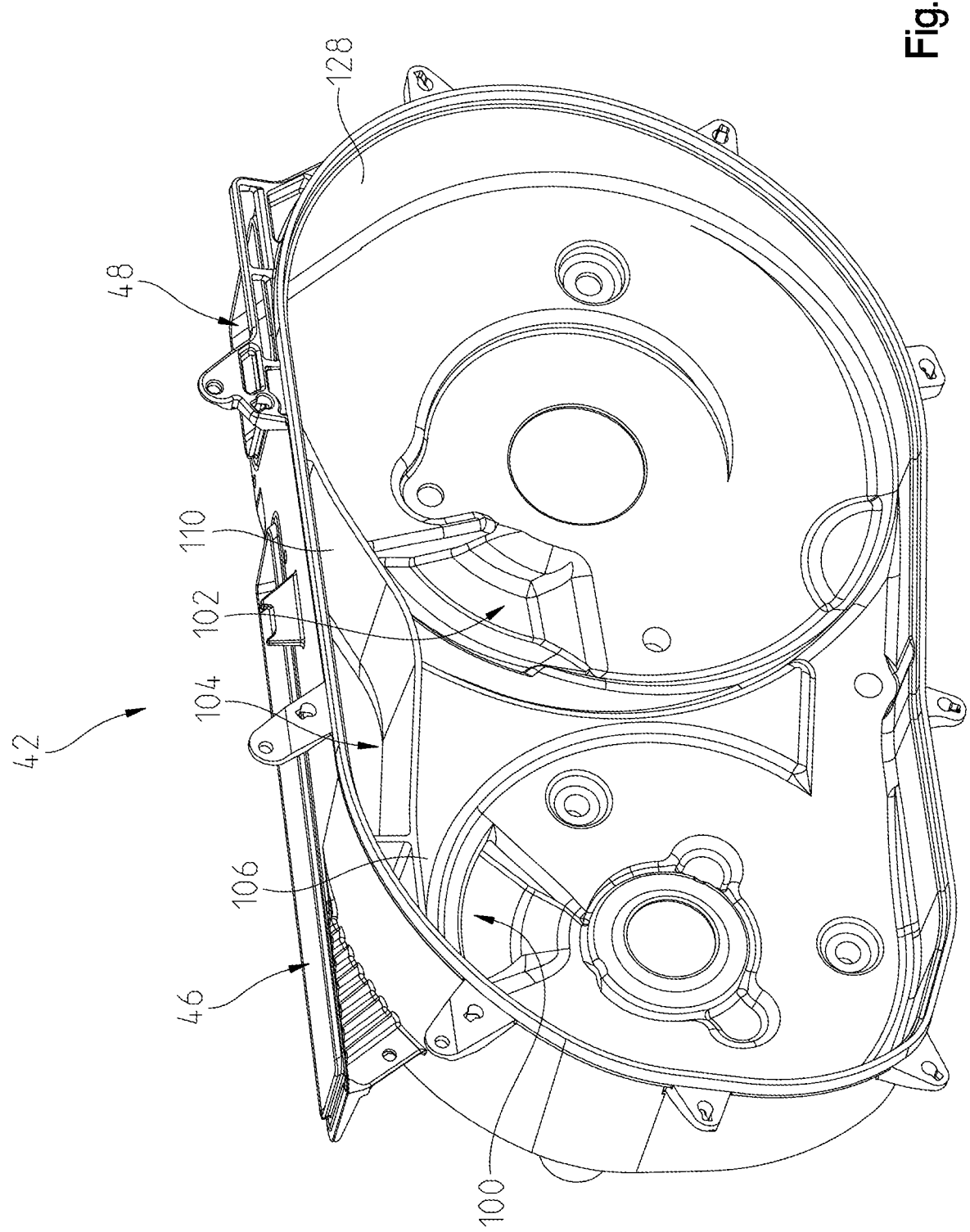
FIG. 9 is front left perspective view of the inner cover of the housing of the CVT of FIG. 3.

With respect to FIGS. 9 and 10, as CVT 34 is operating, heat is generated and the temperature within housing 40 increases. As such, it is necessary to cool CVT 34 during operation thereof. In general, CVT 34 is cooled by providing ambient air within housing 40. More particularly, inner cover 42 receives ambient air through intake duct 50 and inlet port 46. Inner cover 42 includes a first channel 100 which directs air in a first direction toward drive clutch 80, a second channel 102 which directs air in a second direction toward driven clutch 82, and a third channel 104 which directs air in a third direction toward outer cover 44. Illustratively, first channel 100 is defined by a first wall 106 projecting into housing 40 such that air flow from inlet port 46 flows behind or inwardly of first wall 106 and sheaves 86, 88 of drive clutch 80 in order to flow into first channel 100 and towards a rotational axis $R_1$ of drive clutch 80.

Referring still to FIGS. 9 and 10, second channel 102 is defined by a second wall 108 projecting into housing 40 such that air from inlet port 46 flows behind or inwardly of second wall 108 and sheaves 90, 92 of driven clutch 82 in order to flow into second channel 102 towards a rotational axis $R_2$ of driven clutch 82. In this way, the single air inlet at inlet port 46 simultaneous flows cooling air towards both drive and driven clutches 80, 82. Additionally, because first and second channels 100, 102 are defined on inner cover 42 and sheaves 88, 92 are positioned entirely within inner cover 42, the air flowing through first and second channels 100, 102 is initially directed toward sheaves 88, 92 on drive clutch 80 and driven clutch 82, respectively.

Also referring to FIGS. 9 and 10, third channel 104 is defined by a third wall 110 projecting downwardly into inner cover 42 such that air from inlet port 46 flows rearwardly along the surface of third wall 110 and into outer cover 44. By flowing air from air inlet 46 toward outer cover 44, sheaves 86, 90 also receive cooling air. More particularly, because sheaves 86, 90 are adjacent outer cover 44, the air flowing through third channel 104 and into outer cover 44 facilitates cooling of sheaves 86, 90 of drive clutch 80 and driven clutch 82, respectively. In this way, the single air inlet at inlet port 46 simultaneously flows cooling air towards all four sheaves 86, 88, 90, 92.

Figure 11:
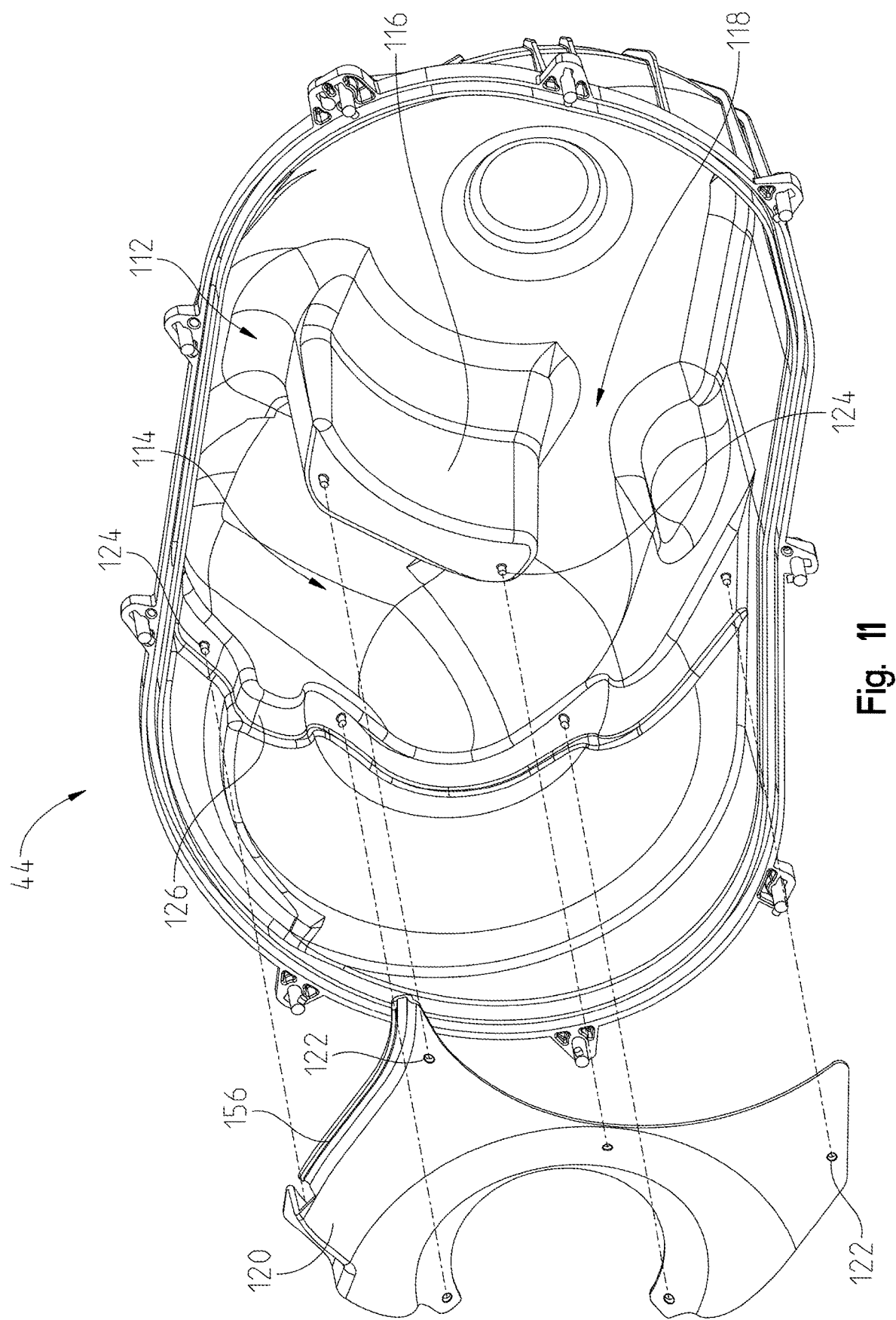
FIG. 11 is an exploded view of the outer cover of the housing of the CVT of FIG. 3.

Once air flows into outer cover 44 from third channel 104, the air at outer cover 44 flows in two directions. More particularly, as shown in FIG. 11, outer cover 44 includes a first channel 112 which directs air in the first direction towards drive clutch 80 and a second channel 114 which directs air in the second direction towards driven clutch 82. First channel 112 of outer cover 44 is partially defined by an upper surface of a protrusion 116 of outer cover 44 which extends into housing 40. Protrusion 116 is positioned intermediate sheaves 86, 90 such that first channel 112 of outer cover 44 directs air toward sheave 86 of drive clutch 80 and second channel 114 of outer cover 44 directs air toward sheave 90 of driven clutch 82.

Referring still to FIG. 11, outer cover 44 further includes a third channel 118 which allows air directed toward drive clutch 80 to flow from drive clutch 80 to driven clutch 82. Third channel 118 of outer cover 44 is partially defined by a lower surface of protrusion 116 and, illustratively, is positioned below or underneath protrusion 116.

As shown in FIG. 11, outer cover 44 also includes a baffle or plate 120 which is coupled to protrusion 116 and is positioned intermediate sheaves 86, 90. In one embodiment, baffle 120 is comprised of an injection-moldable plastic. An upper lip 156 of baffle 120 defines a sealing surface for baffle 120 such that air entering second channel 114 flows only through second channel 114 and does not leak into other portions of housing 40. Additionally, baffle 120 may impinge or restrict air flow through second channel 114 relative to air flow through first channel 112. Because baffle 120 defines a choke point for air flow through second channel 114, more air entering outer cover 44 from third channel 104 on inner cover 42 may flow through first channel 112 than second channel 114 to provide more air flow to drive clutch 80. As disclosed herein, it may be easier to cool driven clutch 82 because driven clutch 82 rotates at a higher speed than drive clutch 80. Therefore, by initially directing more air toward drive clutch 80 through first channel 112 than driven clutch 82 through second channel 114 at outer cover, cooling of drive clutch 80 may be improved. Yet, because of the combination of second and third channels 114, 118, driven clutch 82 still receives sufficient air flow and is efficiently cooled.

To couple baffle 120 to outer housing 44, openings 122 of baffle 120 receive coupling tabs 124 on protrusion 116 and on a wall 126 of outer cover 44. In one embodiment, coupling tabs 124 define welding tabs such that baffle 120 is welded or otherwise fixedly coupled to protrusion 116 and wall 126. In a further embodiment, baffle 120 is removably coupled to protrusion 116 and wall 126 with removable fasteners, such as bolts or screws. Illustratively, baffle 120 extends over third channel 118 of outer cover 44 such that baffle 120 and a lower portion of protrusion 116 cooperate to define third channel 118.

Figure 12:
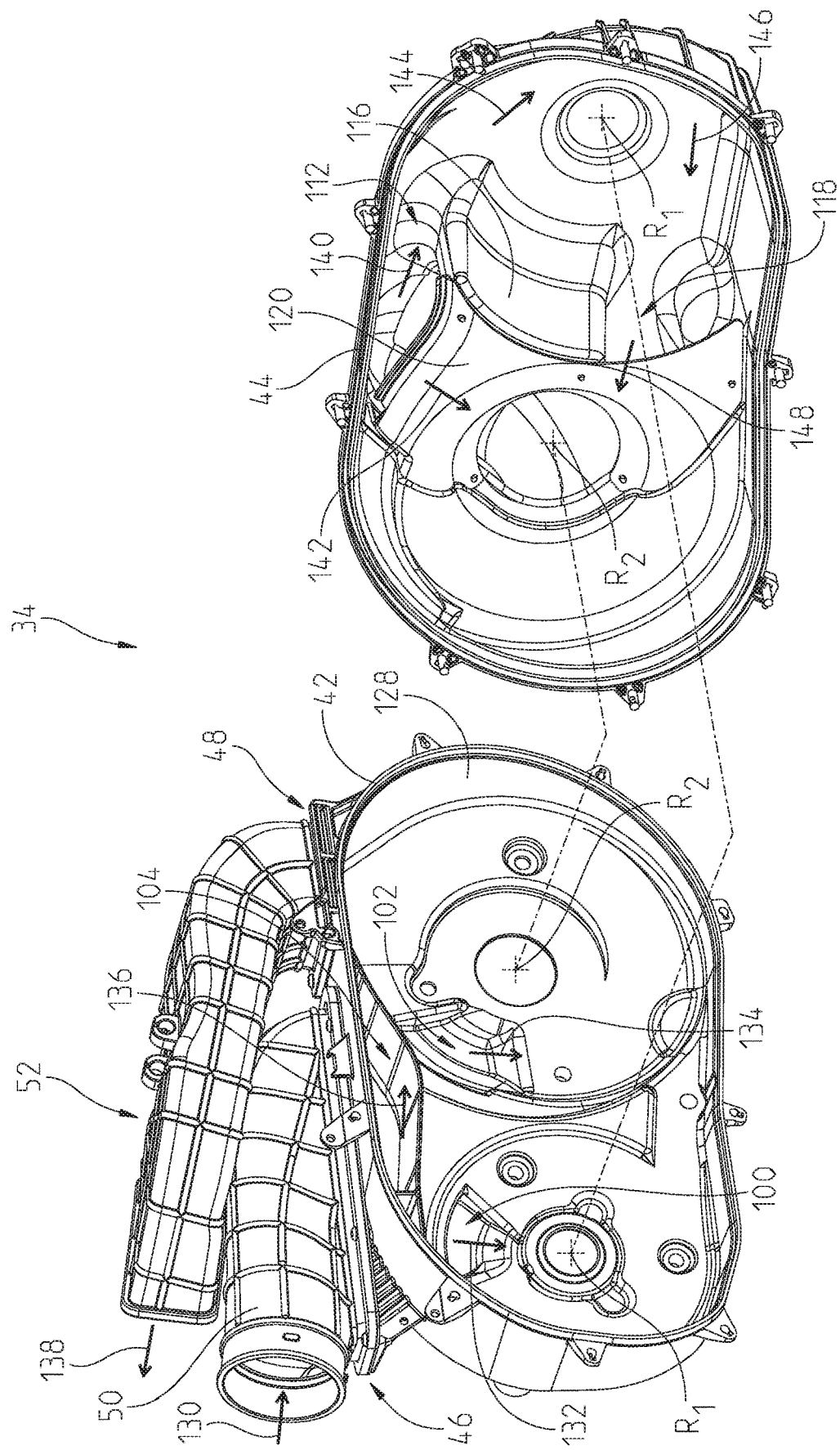
FIG. 12 is an exploded view of the housing of the CVT of FIG. 3.

In operation, and referring to FIG. 12, as CVT 34 operates to rotate drive clutch 80, driven clutch 82, and belt 84, heat is generated within housing 40. In order to cool drive clutch 80, driven clutch 82, and belt 84, ambient air flows into housing 40 through intake duct 50 and through air inlet 46, as shown by arrow 130. Air flowing into intake duct 50 may be filtered upstream of or at intake duct 50. Air flowing as indicated by arrow 130 then flows into inner cover 42 and divides into three separate air flow channels, each extending in a different direction. More particularly, a portion of the air flowing into inner cover 42 flows into first channel 100, as shown by arrow 132, a portion of the air flowing into inner cover 42 flows into second channel 102, as shown by arrow 134, and a portion of the air flowing into inner cover 42 flows into third channel 104, as shown by arrow 136, in order to provide ambient air to drive clutch 80, driven clutch 82, and outer cover 44, respectively. In this way, the single inlet port 46 provides air to all four sheaves 86, 88, 90, 92 of drive and driven clutches 80, 82.

Referring still to FIG. 12, the air in first and second channels 100, 102 of inner cover 42 flows toward the center of and then around drive clutch 80 and driven clutch 82, respectively, and ultimately flows toward a rear wall 128 of inner cover 42. When the air contacts rear wall 128 of inner cover 42, the air flows out of housing 40 through outlet duct 48 and through exhaust duct 52 in the direction of arrow 138, as disclosed further herein. By initially directing a portion of air through first and second channels 100, 102, sheaves 88, 92 which are positioned entirely within inner cover 42 receive cooling ambient air before or simultaneously with sheaves 86, 90 which are adjacent outer cover 44. Directing air to sheaves 88, 92 adjacent inner cover 42 facilitates better cooling of CVT 34 because it may be difficult to provide air to the sheaves adjacent inner cover 42. Additionally, stationary sheave 88 of drive clutch 80 and moveable sheave 92 of driven clutch 82 may not be as efficient in moving air within housing 40 as moveable sheave 86 of drive clutch 80 and stationary sheave 90 of driven clutch. Therefore, by directing air initially to sheaves 88, 92, the overall cooling of CVT 34 is improved because sheaves 88, 92 may be the hardest to cool but receive the initial in-flow of air. As such, the configuration of CVT 34, including the position of inlet port 46 on inner cover 42, allows sheaves 88, 92, which are adjacent inner cover 42, to receive ambient air before or simultaneously with sheaves 86, 90. This improved cooling for CVT 34 may allow for increased belt life of belt 84 and overall improved durability of CVT 34.

Conversely, if inlet port 46 is positioned on outer cover 44, the majority of the air flowing into housing 40 may be concentrated toward rotational axis $R_2$ of driven clutch 82 such that drive clutch 80 may receive an insufficient amount of cooling air. As such, by positioning inlet port 46 on inner cover 42, the air is initially directed to stationary sheave 88 of drive clutch 80 and moveable sheave 92 of driven clutch 82 to efficiently distribute air throughout housing 40 and toward sheaves 86, 90 positioned adjacent outer cover 44.

Additionally, while the incoming air flowing into housing 40 is filtered, some dirt and debris may still be present in the air flowing through intake port 46. However, the configuration of CVT 34 allows for any dirt or debris within the ambient air flowing into housing 40 to be directed away from moveable sheave 86 of drive clutch 80 which contains bearings and other surfaces important to the movement of moveable sheave 86. Instead, as disclosed herein, air is initially directed toward stationary sheave 88 of drive clutch 80 such that any dirt or debris within the air flows instead toward stationary sheave 88 rather than moveable sheave 86. In this way, the configuration of CVT 34 may extend the life of drive clutch 80 and improve clutch wear because moveable sheave 86 of drive clutch 80 does not receive dirt and debris from the ambient air flowing into housing 40.

As shown in FIG. 12, the air flowing through third channel 104 of inner cover 42 and in the direction of arrow 136, flows into outer cover 44. Once the air from third channel 104 flows into outer cover 44, a portion of the air flows into first channel 112 of outer cover 44, as shown by arrow 140, and a portion of the air flows into second channel 114 (FIG. 11), as shown by arrow 142. The air flowing through second channel 114 of outer cover 44, as indicated by arrow 142, flows towards and around stationary sheave 90 of driven clutch 82 and then flows across the top of driven clutch 82 toward moveable sheave 92 of driven clutch 82. After flowing toward moveable sheave 92, the air at driven clutch 82 flows toward rear wall 128 of inner cover 42, as disclosed further herein.

The air flowing through first channel 112 of outer cover 44, as indicated by arrow 142, flows around moveable sheave 86 of drive clutch 80, as shown by arrow 144, continues to flow around the front end of drive clutch 80 and flows toward the bottom of outer cover 44, as shown by arrow 146. After the air in first channel 112 flows around sheave 86 of drive clutch 80, the air flows through third channel 118 of outer cover 44 in the direction of arrow 148 and is directed toward driven clutch 82. Again, the air flowing around driven clutch 82 flows toward rear wall 128 of inner cover 42 and is directed out of housing 40 through outlet port 48 and exhaust duct 52. In general, it may be easier to cool driven clutch 82 than drive clutch 80 because driven clutch 82 rotates at a higher speed than drive clutch 80. Therefore, by directing air towards drive clutch 80 with first channel 112, drive clutch 80 has greater exposure to ambient air for cooling drive clutch 80.

Figure 13:
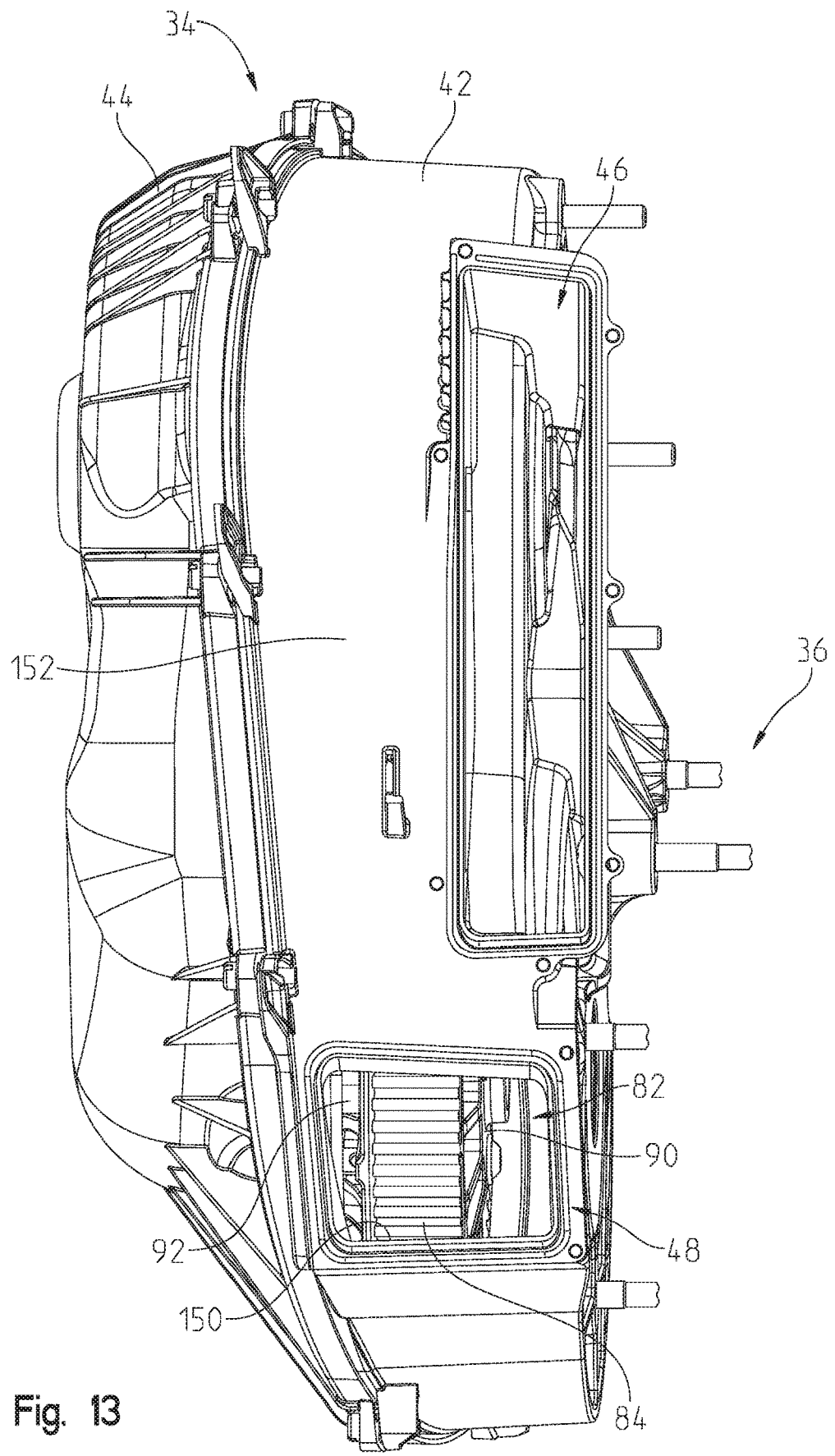
FIG. 13 is a top view of the CVT of FIG. 3.

With respect to FIG. 13, once the air within housing 40 flows around drive and driven clutches 80, 82, the air flows toward rear wall 128 of inner cover 42 to be expelled from housing 40. At rear wall 128, the air flows upwardly toward outlet port 48. Rear wall 128 extends along a substantially tangent plane including line T (FIG. 10) such that the air flowing along rear wall 128 flows in a straight, linear, and continuous flow path toward outlet port 48. In this way, and as shown in FIG. 12, rear wall 128 does not include any protrusions, shoulders, steps, or other interruptions that prevent the air from flowing in a continuous manner toward outlet port 48 or otherwise interrupt the continuous linear flow of air along rear wall 128.

Once the air reaches outlet port 48, the square shape of outlet port 48 allows for a maximum amount of air to flow along the tangent plat at tangent line T (FIG. 10). More particularly, the square shape of outlet port 48 defines a tangent surface 150 which defines a plurality of tangent points thereon which are directly aligned with rear wall 128. In other words, rear wall 128 extends to and defines linear tangent surface 150 of outlet port 48. As such, all of the air flowing through outlet port 48 along tangent surface 150 has a tangential point of contact with outlet port 48. Conversely, if outlet port 48 had a circular or non-square shape, the outlet port would only define one tangent point which directly aligns with rear wall 128 such that only the air directly at the single tangent point would have tangential contact with the outlet port. By configuring outlet port 48 in the shape of a square or other shape configured to include a linear tangent surface 150 and increasing the number of tangent points at outlet port 48 (i.e., all points of contact along tangent surface 150), more air is able to flow in a linear flow path along rear wall 128 without any impingement at outlet port 48. In this way, more hot air is expelled from housing 40 to further facilitate cooling of drive clutch 80, driven clutch 82, and belt 84. In other words, because tangent surface 150 is linear with multiple tangent points at rear wall 128 that facilitate air flow, outlet port 48 does not restrict the air expelled from outlet port 48. And because exhaust duct 52 is sealed against outlet port 48, outlet port 48 is still sealed even with the square shape. In one embodiment, the tangent plane including line T and rear wall 128 may be angled less than 10° from tangent surface 150 such that air flow along rear wall 128 is substantially tangent to tangent surface 150. In a further embodiment, the tangent plane including line T and rear wall 128 may be angled 1-5° from tangent surface 150. Yet, in another embodiment, the tangent plane including line T and rear wall 128 may be angled 1-3° from tangent surface 150. Additionally, the tangent plane including line T and rear wall 128 may be angled up to 1° from tangent surface 150.

Illustratively, as shown in FIG. 13, outlet port 48 extends substantially across the entire width of upper surface 152 of housing 40 such that both sheaves 90, 92 of driven clutch 82 are exposed and visible through outlet port 48 when exhaust duct 52 is removed. More particularly, outlet port 48, including tangent surface 150, extends along and above portions of both sheaves 90, 92 of driven clutch 82. In this way, outlet port 48 has a maximum width which also maximizes the width of tangent surface 150 such that a maximum amount of hot air is expelled from housing 40.

Additional details of vehicle 2 and/or the powertrain assembly may be disclosed in U.S. patent application Ser. No. 62/438,267; U.S. patent application Ser. No. 16/744,850; U.S. patent application Ser. No. 15/388,436; U.S. patent application Ser. No. 15/387,662; and U.S. patent application Ser. No. 16/705,864, the complete disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A continuously variable transmission ("CVT") for a utility vehicle, comprising:
   a drive clutch;
   a driven clutch operably coupled to the drive clutch; and
   a housing generally surrounding the drive and driven clutches, the housing including an inner cover, an outer cover removably coupled to the inner cover, an air inlet positioned on one of the inner cover or the outer cover, and an air outlet positioned on the one of the inner cover or the outer cover, wherein the inner cover includes a planar surface extending from the air inlet to a forward extent of the air outlet.

2. The CVT of claim 1, wherein the air inlet and the air outlet are positioned on the inner cover.

3. The CVT of claim 1, wherein the inner cover includes a first channel configured to flow air from the air inlet within the inner cover and a second channel configured to flow air from the air inlet within the outer cover.

4. The CVT of claim 3, wherein the outer cover includes a third channel configured to direct air to the driven clutch.

5. The CVT of claim 4, wherein the outer cover includes a baffle positioned intermediate a portion of the drive clutch and a portion of the driven clutch.

6. The CVT of claim 4, wherein the outer cover includes a fourth channel configured to receive air from the second channel of the inner cover, and the fourth channel is configured to direct air to the drive clutch.

7. The CVT of claim 1, wherein the inner cover includes a first channel to direct air to the drive clutch and the outer cover includes a second channel to direct air to the drive clutch.

8. A continuously variable transmission ("CVT") for a utility vehicle, comprising:
   a drive clutch;
   a driven clutch operably coupled to the drive clutch; and
   a housing generally surrounding the drive and driven clutches, the housing including an inner cover and an outer cover removably coupled to the inner cover, and the housing further including an air inlet and an air outlet, and the housing being configured to direct air from the air inlet in a first direction at the inner cover, in a second direction at the inner cover, and in a third direction at the inner cover, the second direction being different than the first direction.

9. The CVT of claim 8, wherein the first direction is towards the drive clutch, the second direction is towards the driven clutch, and the third direction is towards the outer cover.

10. The CVT of claim 8, wherein the third direction is towards the outer cover, and air at the drive clutch and within the outer cover is directed toward the driven clutch.

11. The CVT of claim 10, wherein the outer cover includes a channel and the air directed towards the driven clutch from the drive clutch flows through the channel.

12. The CVT of claim 11, wherein the outer cover includes a baffle extending over a portion of the channel of the outer cover.

13. The CVT of claim 8, wherein the third direction is substantially perpendicular to the first and second directions.

14. A continuously variable transmission ("CVT") for a utility vehicle, comprising:
   a drive clutch having a moveable sheave and a stationary sheave;
   a driven clutch operably coupled to the drive clutch and having a moveable sheave and a stationary sheave; and
   a housing generally surrounding the drive and driven clutches, the housing including an inner cover comprised of a metallic material, an outer cover removably coupled to the inner cover, an air inlet positioned on one of the inner cover or the outer cover, and an air outlet spaced apart from the air inlet, the air outlet having a width, and the air outlet including a substantially tangent surface extending laterally along a planar surface of the housing to define the width of the air outlet and extending along a portion of the moveable sheave and the stationary sheave of the driven clutch, and the housing having a rear surface configured to flow air along the tangent surface when the air is expelled from the housing.

15. The CVT of claim 14, wherein the air inlet and the air outlet are positioned on the inner cover.

16. The CVT of claim 14, wherein the air outlet has a generally square shape.

17. The CVT of claim 14, wherein the air expelled from the housing is directed rearwardly from the driven clutch to the rear surface of the housing and is directed upwardly toward the tangent surface of the air outlet.

18. The CVT of claim 14, wherein a portion of the rear surface of the housing extends linearly and continuously to the tangent surface.

19. The CVT of claim 14, wherein the inner cover directs air in a first direction toward the drive clutch, in a second direction toward the driven clutch, and in a third direction toward the outer cover.

20. The CVT of claim 14, wherein the planar surface is an upper surface of the housing.

21. The CVT of claim 14, wherein the air inlet and the air outlet are both positioned along the planar surface.

* * * * *